(12) United States Patent
Hozumi

(10) Patent No.: US 8,615,154 B2
(45) Date of Patent: Dec. 24, 2013

(54) VIDEO-AUDIO PROCESSING APPARATUS AND VIDEO-AUDIO PROCESSING METHOD

(75) Inventor: Yoshiko Hozumi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 119 days.

(21) Appl. No.: 13/313,434

(22) Filed: Dec. 7, 2011

(65) Prior Publication Data

US 2012/0148208 A1     Jun. 14, 2012

(30) Foreign Application Priority Data

Dec. 8, 2010   (JP) .................................. 2010-274081

(51) Int. Cl.
*H04N 5/932*   (2006.01)
*H04N 5/93*    (2006.01)

(52) U.S. Cl.
USPC ........... 386/201; 386/354; 386/356; 386/324; 386/224; 386/230; 386/207; 386/339; 386/337

(58) Field of Classification Search
USPC ......... 386/354, 356, 324, 224, 230, 201, 207, 386/339, 337
See application file for complete search history.

(56) References Cited

U.S. PATENT DOCUMENTS

| 5,184,295 | A  | * | 2/1993  | Mann ............................ 473/221 |
| 5,815,634 | A  | * | 9/1998  | Daum et al. .................. 386/203 |
| 5,904,484 | A  | * | 5/1999  | Burns ........................... 434/252 |
| 6,537,076 | B2 | * | 3/2003  | McNitt et al. ................. 434/252 |
| 8,418,085 | B2 | * | 4/2013  | Snook ........................... 715/863 |
| 2003/0198460 | A1 | * | 10/2003 | Kawamura et al. ............. 386/68 |
| 2009/0207277 | A1 | * | 8/2009  | Kurihara et al. ........... 348/231.4 |
| 2010/0178034 | A1 | * | 7/2010  | Masuo et al. .................. 386/95 |

FOREIGN PATENT DOCUMENTS

| JP | 2001-036867 A | 2/2001 |
| JP | 2003-078863 A | 3/2003 |
| JP | 2007-110219 A | 4/2007 |
| JP | 2008-193561 A | 8/2008 |

* cited by examiner

*Primary Examiner* — Helen Shibru
(74) *Attorney, Agent, or Firm* — Marvin A. Motsenbocker; MOTS Law, PLLC

(57) ABSTRACT

A video-audio processing method includes acquiring encoded audio data, decoding the acquired encoded audio data and thereby creating audio data; causing an audio output unit to output the created audio data, capturing a video image of an object in synchronization with an output of the audio data by the audio output unit and thereby creating first video data, encoding the created first video data and thereby creating first encoded video data, holding the first encoded video data, and multiplexing the encoded audio data and the first encoded video data and thereby creating a first stream.

7 Claims, 9 Drawing Sheets

FIG. 6A
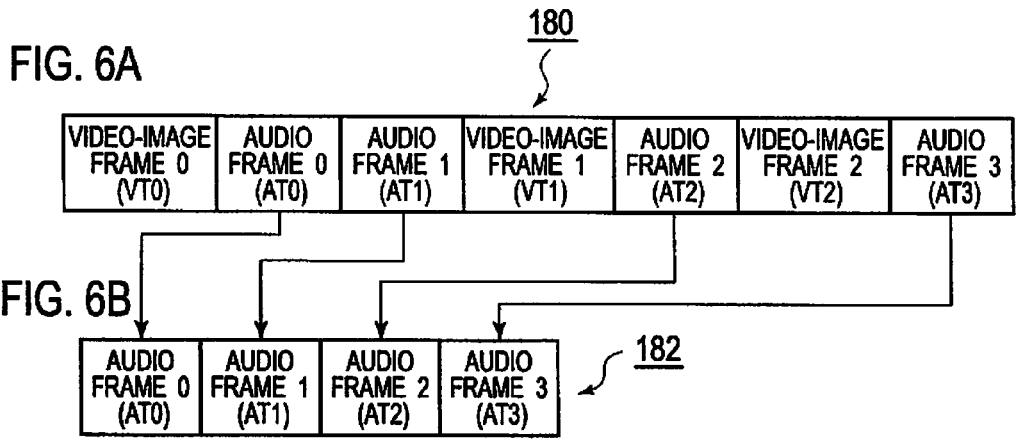
FIG. 6B
FIG. 6C
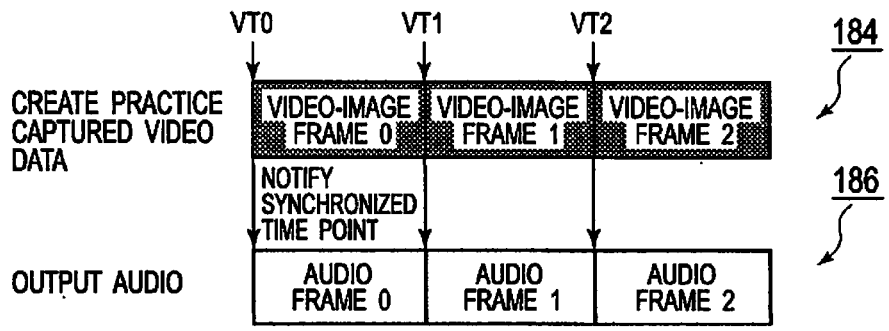
FIG. 6D
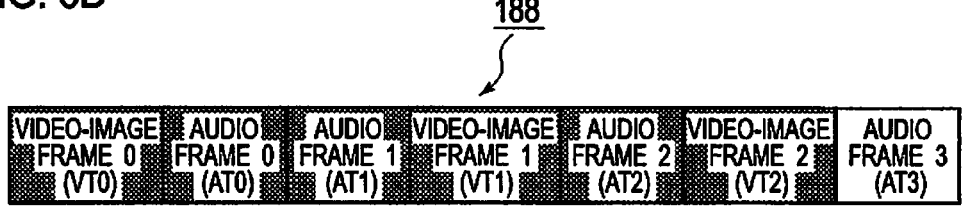

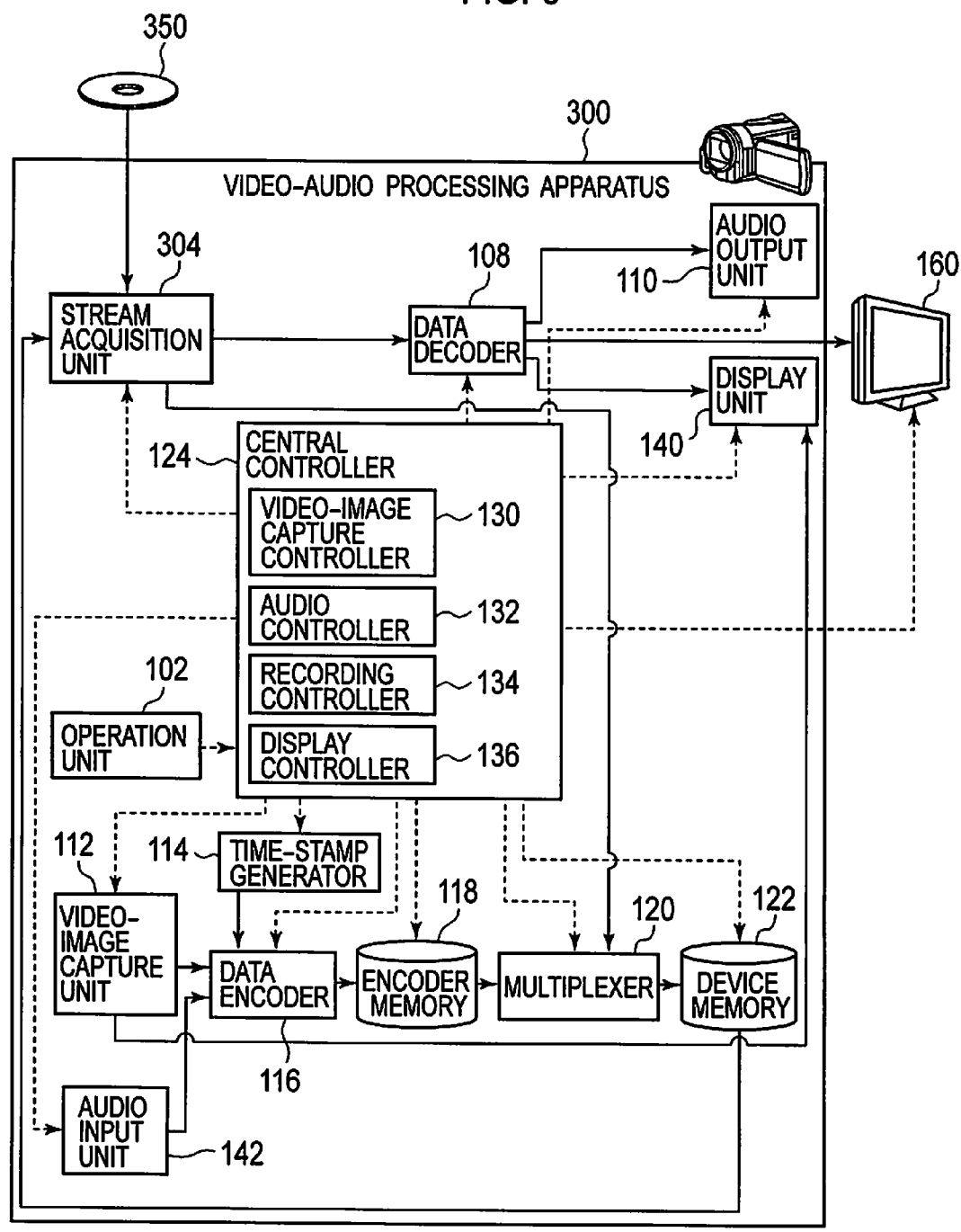

VIDEO-AUDIO PROCESSING APPARATUS AND VIDEO-AUDIO PROCESSING METHOD

CROSS REFERENCE TO RELATED APPLICATIONS

This application claims priority based on 35 USC 119 from prior Japanese Patent Application No. 2010-274081 filed on Dec. 8, 2010, entitled "VIDEO-AUDIO PROCESSING APPARATUS AND VIDEO-AUDIO PROCESSING METHOD", the entire contents of which are incorporated herein by reference.

BACKGROUND OF THE INVENTION

1. Field of the Invention

The present disclosure relates to a video-audio processing apparatus and a video-audio processing method for synchronizing video data and audio data acquired at different times.

2. Description of Related Art

When a person practices a dance of a certain kind, such as a Japanese traditional dance, or aerobics or the like, or practices an exercise for fitness or the like, the person may want to compare his/her own form with an exemplary form performed by his/her coach, teacher, instructor or the like. If a video image of the user can be captured (recorded) and displayed in synchronization with the video image of the exemplary form performed by his/her coach in a side-by-side manner, then the person (user, student or the like) can compare his/her own form with the exemplary form and check the difference therebetween through the video images.

As a technique to reproduce plural (or multiple) video images in synchronization with each other, a technique has been proposed in which a sound such as a whistle, an electronic tone or a voice is recorded at the start of video-image capture (recording). Based on the recorded sound, plural video images are then reproduced from the recorded data in synchronization with each other. See, for example, Japanese Patent Application Publication No. 2001-36867.

A technique has also been proposed for simultaneously and synchronously reproducing two video images captured by two video imaging apparatuses. In this technique, the correlation values of two audio data, recorded independently by the two video imaging apparatuses, are calculated with a time shift between the two audio data that is changed gradually. The time shift with the maximum correlation value is then used to control the reproduction timings of the two video data. See, for example, Japanese Patent Application Publication No. 2008-193561.

SUMMARY OF THE INVENTION

The above-described two techniques require complicated timing adjustment operations to synchronize the video data, and the details of the operations are troublesome in being problematic and time-consuming. Moreover, the technique of Japanese Patent Application Publication No. 2008-193561 requires the user to perform, not only a troublesome timing adjustment operation, but also a troublesome sound generation operation due to the need to generate the sound at the start of the video-image capture (video-image recording). Furthermore, the above-described two techniques still have the possibility of the video signals and audio signals not being synchronized with each other as desired because of an incorrect recognition that may occur due to the influence of noises in the video and audio signals caused by surrounding noise or the like.

An aspect of the invention aims to provide a video-audio processing apparatus and a video-audio processing method capable of easily synchronizing plural video images with each other without requiring the user to perform any troublesome timing adjustment operation or the like.

Another aspect of the invention aims to provide a video-audio processing apparatus and a video-audio processing method capable of reliably synchronizing plural video images with each other even when the video is recorded under an environment where noise, such as a surrounding or ambient noise exists or is generated.

A first aspect of the invention is a video-audio processing apparatus that includes: a stream acquisition unit configured to acquire encoded audio data; a data decoder configured to decode the acquired encoded audio data and thereby create audio data; an audio controller configured to cause an audio output unit to output the created audio data; a video-image capture unit configured to capture a video image of an object in synchronization with an output of the audio data by the audio output unit, and thereby create first video data; a data encoder configured to encode the created first video data, and thereby create first encoded video data; a recording controller configured to cause an encoder memory to hold the first encoded video data; and a multiplexer configured to multiplex the encoded audio data and the first encoded video data, and thereby create a first stream.

A second aspect of the invention is a video-audio processing method that includes: acquiring encoded audio data; decoding the acquired encoded audio data, and thereby creating audio data; causing an audio output unit to output the created audio data; capturing a video image of an object in synchronization with an output of the audio data by the audio output unit, and thereby creating first video data; encoding the created first video data, and thereby creating first encoded video data; holding the first encoded video data; and multiplexing the encoded audio data and the first encoded video data, and thereby creating a first stream.

BRIEF DESCRIPTION OF THE DRAWINGS

FIG. 6 is a conceptual diagram for explaining specific processes in the multiplexer in a practice video-image capture mode.

FIG. 8 is a functional block diagram illustrating a general configuration of a video-audio processing apparatus according to a second embodiment.

DETAILED DESCRIPTION OF EMBODIMENTS

Figure 1:
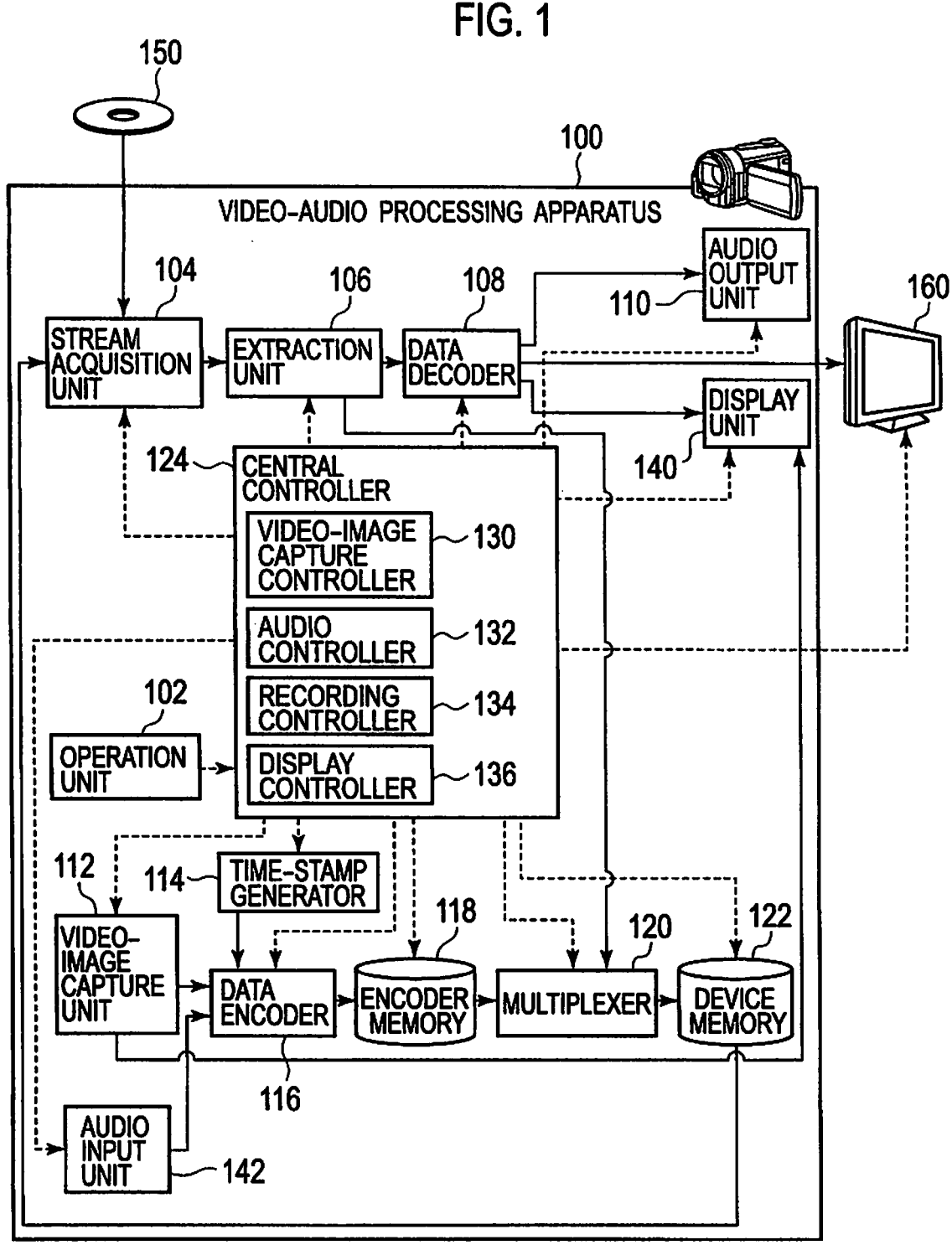
FIG. 1 is a functional block diagram illustrating a general configuration of a video-audio processing apparatus according to a first embodiment.

Preferred embodiments of the invention are described in detail below by referring to the accompanied drawings. Dimensions, materials, other specific numerical values, and the like are merely provided in the following embodiments as examples to facilitate the understanding of the invention, and are not intended to limit the invention unless otherwise mentioned. Note that in the specification and drawings, elements having substantially the same functions and configurations are denoted by the same reference numerals, and the repetitive description thereof is omitted. In addition, elements that are not directly related to the invention are not illustrated.
First Embodiment There are times when a person may want to compare his/her own form movement with an exemplary form movement. Examples of this are when practicing certain kinds of dance, or practicing an exercise or the like. Taking as an example the case where a user practices a dance, an exercise or the like, this embodiment describes video-audio processing apparatus 100 (FIG. 1) capable of easily and reliably synchronizing a video image of a practice scene with a video image of an exemplary performance, thereby allowing the user to compare the video images.

First, a specific configuration of video-audio processing apparatus 100 is described, and then a video-audio processing method using video-audio processing apparatus 100 is described.

Video-audio processing apparatus 100 of this embodiment has the following three modes: a mode of normal video-image capture to create a stream (video data and audio data) based on the video image and the sound of the exemplary performance (hereinafter, simply referred to as "a normal video capture mode"); a mode to create a stream based on the video image of a practice scene of the user him/herself (hereinafter, simply referred to as "a practice video capture mode"); and a mode to reproduce the contents of the created streams (hereinafter, simply referred to as "a reproduction mode"). The user can switch among these three modes by selecting any one of the modes using an operation input to an operation unit or the like, which is described later.

In the normal video capture mode, a stream is created in the following manner. First, a video-image capture unit of video-audio processing apparatus 100 captures by recording a video image of an object to create video data (hereinafter, referred to as "normal captured video data"). Then, an audio input unit creates audio data based on the sounds inputted in parallel with the capturing of the video image. Thereafter, the created normal captured video data and the created audio data are encoded and multiplexed to create a stream.

In the practice video capture mode, by referring to the stream created in the normal video capture mode or to the stream acquired from an external recording medium, the video-image capture unit captures the video image of actions that a user takes in tune with the audio data of the referred-to stream. The captured video data (hereinafter, referred to as "practice captured video data") and the audio data in the referred-to stream are encoded and multiplexed to create a stream.

Hereinafter, the stream referred to in the practice video capture mode is called encoded normal captured video/audio data, which are created in the normal video capture mode. In addition, the stream created in the practice video capture mode is called encoded practice captured video/audio data.

In the reproduction mode, a display unit or the like outputs (reproduces the content of) video data from any of the three streams, namely, the stream acquired from an external recording medium, the stream created in the normal video capture mode, and the stream created in the practice video capture mode. In addition, in the reproduction mode, an audio output unit outputs the audio data.

In the reproduction mode, video-audio processing apparatus 100 also can reproduce the contents of the stream created in the practice video capture mode in parallel with either the stream created in the normal video capture mode or the stream acquired from the external recording medium (hereinafter, simply referred to as "a parallel reproduction mode"). In the parallel reproduction mode, video-audio processing apparatus 100 displays the video images of the video data in the stream created in the normal video capture mode, and the practice captured video data created in the practice video capture mode, in parallel with each other. In addition, in the parallel reproduction mode, video-audio processing apparatus 100 outputs audio data of the stream created in the normal video capture mode, or audio data created in the practice video capture mode.

Hereinafter, the specific configuration of video-audio processing apparatus 100 is described in detail, and then a flow of processes in each of the above-mentioned modes is described.
Video-Audio Processing Apparatus 100

FIG. 1 is a functional block diagram illustrating a general configuration of video-audio processing apparatus 100 according to a first embodiment. As shown in FIG. 1, video-audio processing apparatus 100 includes operation unit 102, stream acquisition unit 104, extraction unit 106, data decoder 108, audio output unit 110, video-image capture unit 112, time-stamp generator 114, data encoder 116, encoder memory 118, multiplexer 120, device memory 122, central controller 124, display unit 140, and audio input unit 142. In FIG. 1, arrows with solid lines represent the flows of data, and arrows with dashed lines represent the flows or directions of control.

Operation unit 102 includes: an operation key including a release switch; a D-pad; a joystick, a touch panel provided on a display screen of display unit 140, which is described in detail later. Operation unit 102 receives operation signals inputted by a user such as: a start or a stop of capturing video images; and a selection of the normal video capture mode, the practice video capture mode, or the reproduction mode.

Stream acquisition unit 104 acquires a stream from a stream record position (a place where a stream is secured, such as a reader device for a DVD (Digital Versatile Disc) or device memory 122, which is described later) selected by the user through operation unit 102. For example, in the practice video capture mode or in the reproduction mode, when the user selects device memory 122 through an operation input to operation unit 102, stream acquisition unit 104 selects device memory 122 as the stream record position. Subsequently, when the user further selects encoded normal captured video/audio data through an operation input to operation unit 102, stream acquisition unit 104 acquires encoded normal recorded or captured video/audio data from device memory 122.

Here, the stream is formed by multiplexing encoded video data and encoded audio data. As an example, stream acquisition unit 104 acquires a stream from device memory 122 in this embodiment. Stream acquisition unit 104 may acquire a stream from external recording medium 150, such as a DVD, a BD (Blu-ray Disc), or a flash memory.

Extraction unit 106 extracts encoded audio data and encoded video data from the stream acquired by stream acquisition unit 104. In this embodiment, the encoded video data extracted from the encoded normal captured video/audio data by extraction unit 106 are referred to as the encoded normal captured video data, and the encoded audio data extracted likewise are referred to as the encoded normal audio data.

Data decoder 108 decodes the encoded audio data extracted by extraction unit 106, and thereby creates audio data. In addition, data decoder 108 decodes the encoded video data, and thereby creates video data.

Audio output unit 110 includes a speaker or the like. In response to the control command outputted by audio controller 132, which is described later, audio output unit 110 outputs sounds based on audio data decoded by data decoder 108. Hereinafter, the action of audio output unit 110 in outputting sounds based on audio data may be simply referred to as the action of audio output unit 110 outputting audio data.

Audio output unit 110 outputs no audio data when the normal video capture mode is selected. In contrast, when the practice video capture mode is selected, audio output unit 110 outputs normal audio data of the encoded normal captured video/audio data. A detailed description of audio output unit 110 is given later in the video-audio processing method.

Video-image capture unit 112 includes: a focus lens (not illustrated) used to focus an object; a diaphragm (iris) used to adjust exposure; a zoom lens used to zoom in towards and out from the object; imaging elements used to photoelectrically convert the incident light coming through the lenses and perform analog-digital conversion into digital video data; and a driver circuit used to drive the focus lens, the diaphragm, the zoom lens, and the imaging elements. Video-image capture unit 112 controls these components and thereby creates video data in response to the control executed by video-image capture controller 130, which is described later.

In the practice video capture mode, video-image capture unit 112 captures video images of an object (e.g., a practice scene of the user) so that the captured video images can be synchronized with the normal audio data outputted by audio output unit 110. Thus, video-image capture unit 112 creates the practice captured video data.

Time-stamp generator 114 generates time stamps on the basis of the clock of video-audio processing apparatus 100. The time stamp mentioned above refers to information indicating a start time to create video data or audio data.

Data encoder 116 encodes the video data created by video-image capture unit 112, and thereby creates encoded video data (encoded normal captured video data and encoded practice captured video data). Then, data encoder 116 assigns the encoded video data a time stamp generated by time-stamp generator 114. In addition, data encoder 116 encodes audio data created by audio input unit 142, and thereby creates encoded audio data. Subsequently, data encoder 116 assigns the encoded audio data a time stamp generated by time-stamp generator 114.

Next, data encoder 116 outputs the generated encoded video data and the generated encoded audio data to encoder memory 118.

Encoder memory 118 includes a memory medium, such as an SRAM (static random access memory) or a DRAM (dynamic RAM). In response to a control command outputted by recording controller 134, which is described later, encoder memory 118 temporarily holds the encoded video data and the encoded audio data created by data encoder 116.

Multiplexer 120 multiplexes the encoded video data and the encoded audio data held by encoder memory 118. When the normal video capture mode is selected, multiplexer 120 multiplexes the encoded normal captured video data and the encoded normal audio data, and thereby creates encoded normal captured video/audio data. When the practice video capture mode is selected, multiplexer 120 multiplexes the encoded practice captured video data and the encoded normal audio data of the encoded normal captured video/audio data, and thereby creates encoded practice captured video/audio data.

Specific processes performed by multiplexer 120 in the normal video capture mode and the practice video capture mode are described later in the video-audio processing method.

Device memory 122 includes a recording medium, such as a RAM, an EEPROM (electrically erasable and programmable read only memory), a nonvolatile RAM, a flash memory, or an HDD (hard disk drive). In response to a control command outputted by a recording controller, device memory 122 records the stream (encoded normal captured video/audio data and encoded practice captured video/audio data) created by multiplexer 120.

Central controller 124 includes a semiconductor integrated circuit including: a central processing unit (CPU); a ROM where a program to operate central controller 124 and the like are stored; and a RAM that is used to temporarily save data or that is used in data processing. Central controller 124 works in cooperation with device memory 122 and other electronic circuits to manage and control the entire video-audio processing apparatus 100. In addition, central controller 124 also functions as video-image capture controller 130, audio controller 132, recording controller 134, and display controller 136.

Video-image capture controller 130 controls video-image capture unit 112 in response to an operation input made by the user. For example, video-image capture controller 130 causes a driver circuit to drive the zoom lens, the focus lens, the diaphragm, and the imaging elements so that adequate video data can be obtained. In addition, video-image capture controller 130 moves the zoom lens and the focus lens in performing the zoom function (magnification changing function).

Audio controller 132 causes audio output unit 110 to output audio data decoded by data decoder 108. When the practice video capture mode is selected, audio controller 132 of this embodiment causes audio output unit 110 to output normal audio data obtained by decoding the encoded normal audio data of the encoded normal captured video/audio data. When the parallel reproduction mode is selected, audio controller 132 of this embodiment causes audio output unit 110 to output normal audio data obtained by decoding the encoded normal audio data of the encoded normal captured video/audio data or the encoded practice captured video/audio data. In addition, audio controller 132 causes audio input unit 142, which is described later, to convert the recorded sounds to audio data.

Recording controller 134 causes encoder memory 118 to hold the encoded video data and the encoded audio data. In addition, recording controller 134 causes device memory 122 to record the stream created by multiplexer 120.

In the practice video capture mode, display controller 136 causes display unit 140 or video-image display apparatus 160, which is provided independently of video-audio processing apparatus 100, to display a video image currently being captured or a video image based on the normal captured video data decoded by data decoder 108, in synchronization with an output of the normal audio data by audio output unit 110. Moreover, in the normal video capture mode, display controller 136 causes display unit 140 to display the video image that is being captured. Furthermore, in the reproduction mode, display controller 136 causes display unit 140 or video-image display apparatus 160 to display the video image based on the video data of the stream of the reproduction target. Hereinafter, the action of display unit 140 or video-image display apparatus 160 displaying the video images based on the video data may also be simply referred to as the action of display unit 140 or video-image display apparatus 160 displaying the video data, in an abbreviated manner.

Accordingly, in the practice video capture mode, the user not only can listen to the sounds based on the normal audio data but also can visually recognize the video image that is being captured (e.g., the video image of a practice scene of the user him/herself) through display unit 140 or video-image display apparatus 160. In addition, the user not only can listen to the sounds based on the normal audio data but also can visually recognize the video image of the exemplary performance based on the normal captured video data, through display unit 140 or video-image display apparatus 160, while the user is performing actions such as a dance or an exercise.

In this embodiment, when the parallel reproduction mode is selected, the display controller 136 causes display unit 140 or video-image display apparatus 160 to display, in a parallel manner, the normal captured video data of the encoded normal captured video/audio data and the practice captured video data of the encoded practice captured video/audio data. Specific processes performed by display controller 136 in the parallel reproduction mode are described later in the video-audio processing method.

Display unit 140 includes a liquid crystal display, an organic EL (electro luminescence) display, or the like. In response to a control command outputted by display controller 136, display unit 140 displays video images such as one based on the normal captured video data, one that is being captured, and one based on the video data (normal captured video data and practice captured video data) of the stream of the reproduction target.

Audio input unit 142 includes a microphone. In the case of the normal video capture mode, audio input unit 142 converts the sounds inputted at the time of capturing video images to electric signals to create normal audio data in response to a control command outputted by audio controller 132.

Video-Audio Processing Method

Figure 2:
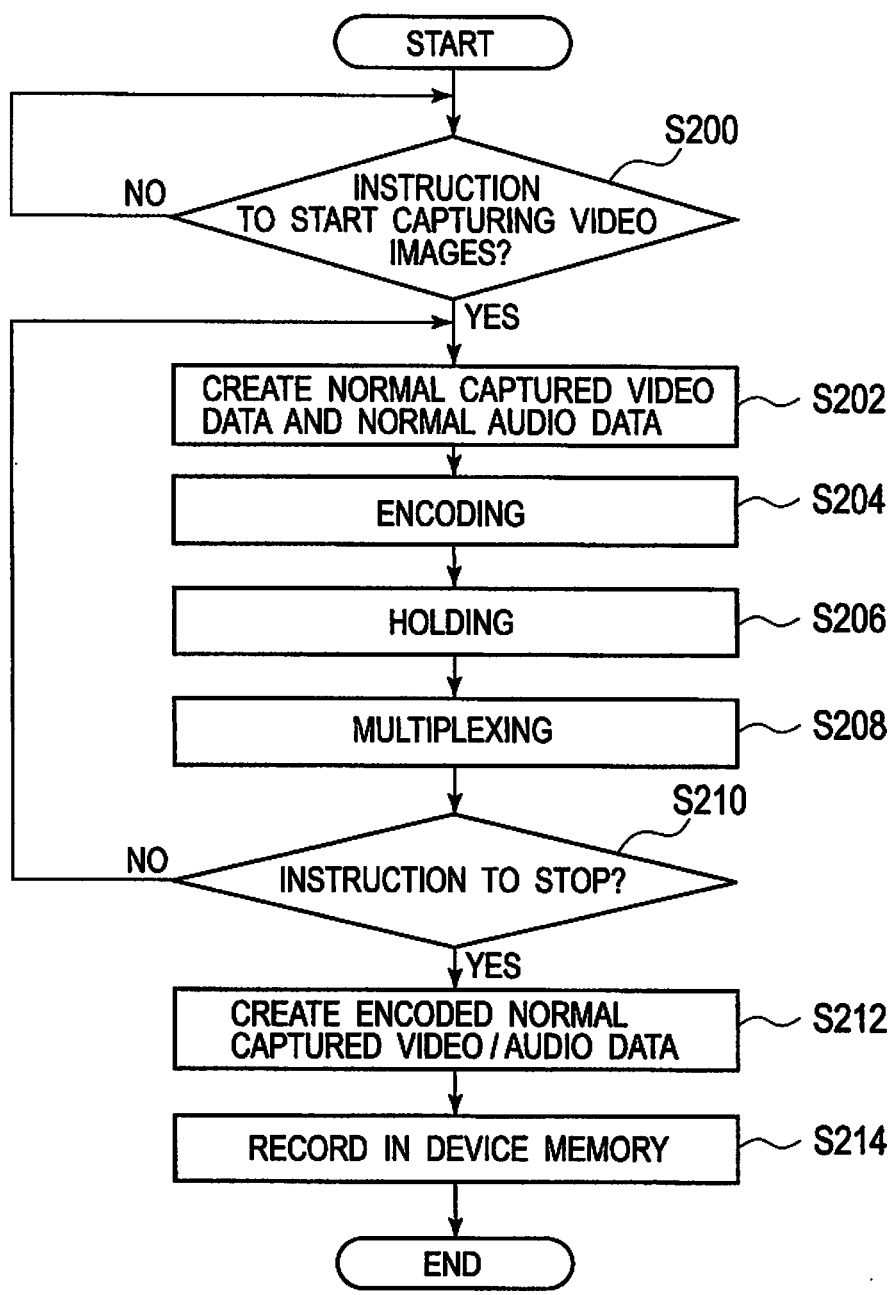
FIG. 2 is a flowchart explaining a flow of processes in a video-audio processing method using the video-audio processing apparatus according to the first embodiment.
Figure 3:
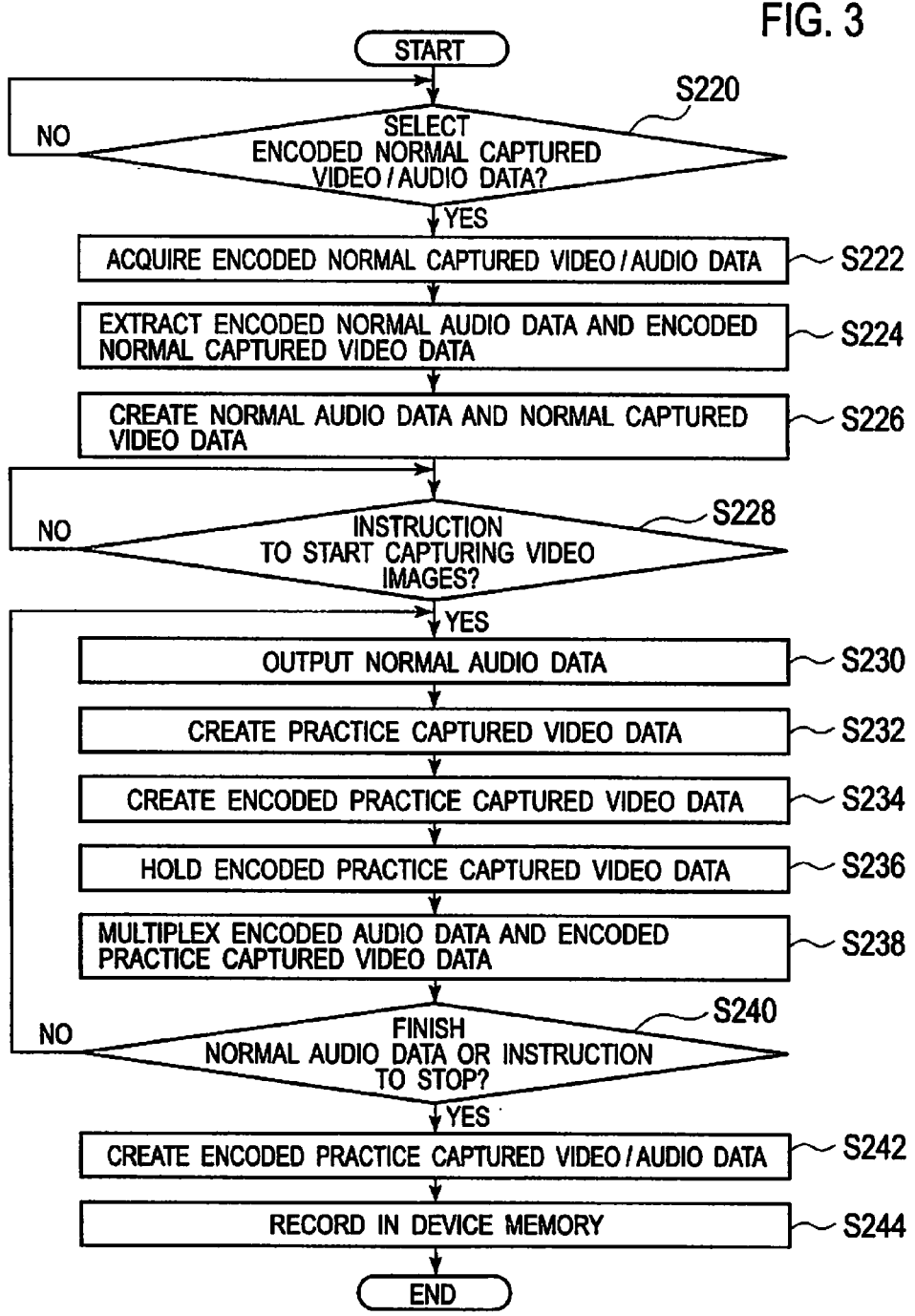
FIG. 3 is a flowchart explaining a second flow of processes in the video-audio processing method using the video-audio processing apparatus according to the first embodiment.
Figure 4:
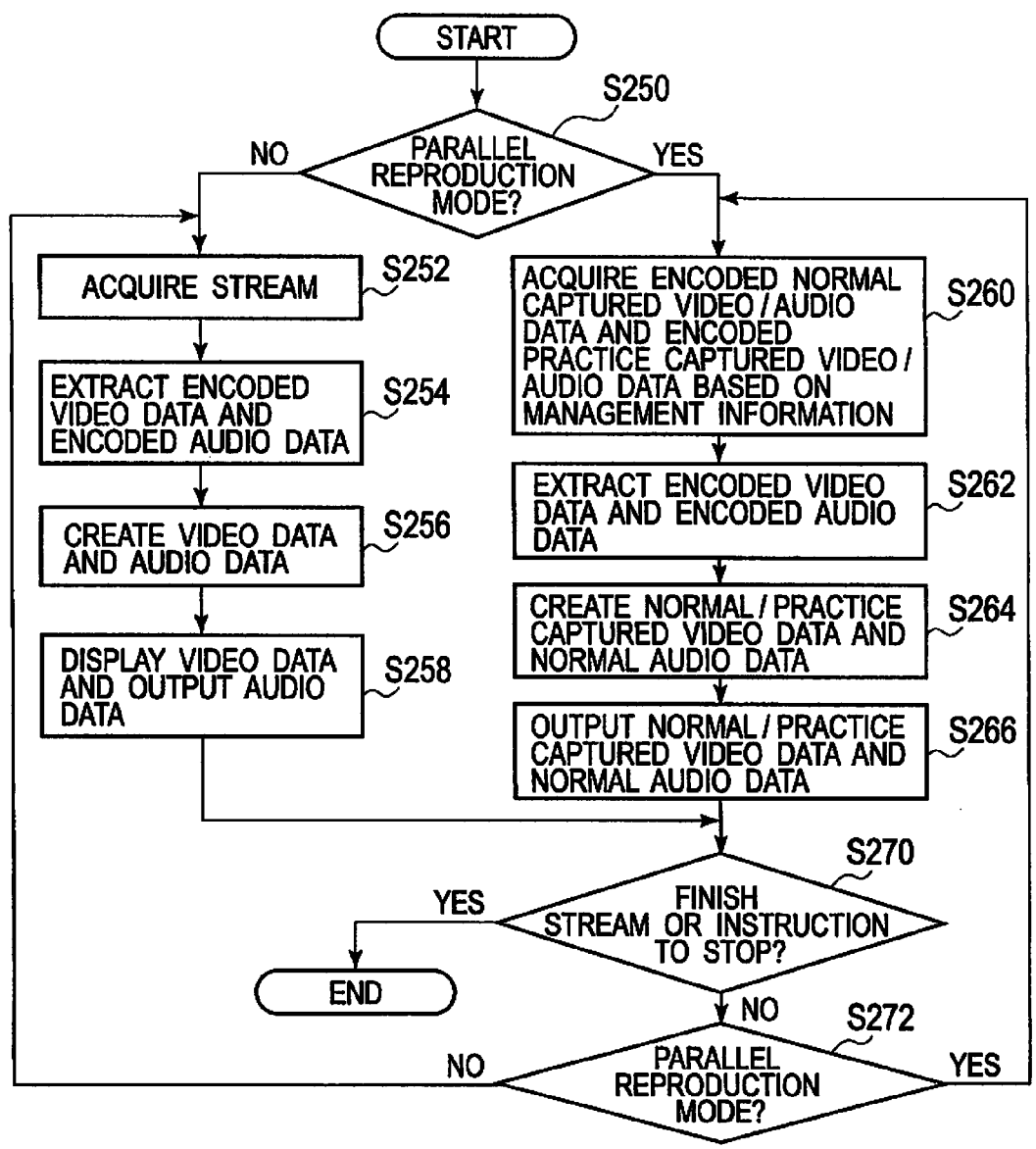
FIG. 4 is a flowchart explaining a third flow of processes in the video-audio processing method using the video-audio processing apparatus according to the first embodiment.

FIGS. 2 to 4 are flowcharts each explaining a flow of processes in a video-audio processing method using video-audio processing apparatus 100 according to the first embodiment. To be more specific, FIG. 2 illustrates the flow of the processes performed by video-audio processing apparatus 100 in the normal video capture mode. FIG. 3 illustrates the flow of the processes performed by video-audio processing apparatus 100 in the practice video capture mode. FIG. 4 illustrates the flow of the processes performed by video-audio processing apparatus 100 in the reproduction mode.

As shown in FIG. 2, if the normal video capture mode is selected and the user gives an instruction to start capturing video images through an operation input to operation unit 102 (YES at S200), video-image capture controller 130 causes video-image capture unit 112 to create normal captured video data, and audio controller 132 creates normal audio data from the sounds inputted in audio input unit 142, in response to the video-image capture start input made by the user to operation unit 102 (S202).

Then, data encoder 116 encodes normal captured video data created at data creating step S202, and thereby creates encoded normal captured video data with a time stamp. In addition, data encoder 116 encodes normal audio data, and thereby creates encoded normal audio data with a time stamp (S204). Subsequently, recording controller 134 causes encoder memory 118 to temporarily hold the encoded normal captured video data and the encoded normal audio data (S206).

Multiplexer 120 multiplexes the encoded normal captured video data and the encoded normal audio data created at encoding step S204 (S208).

Then, if there is no input of the command through operation unit 102 by the user to stop the normal video capture mode (NO at S210), the processes at data creation step S202 onwards are performed. If there is an input of the command through operation unit 102 by the user to stop the normal video capture mode (YES at S210), multiplexer 120 creates encoded normal captured video/audio data by multiplexing the encoded normal captured video data and the encoded normal audio data (S212). Thereafter, recording controller 134 causes device memory 122 to record the stream (encoded normal captured video/audio data) created at stream creation step S212 (S214).

Figure 5A:
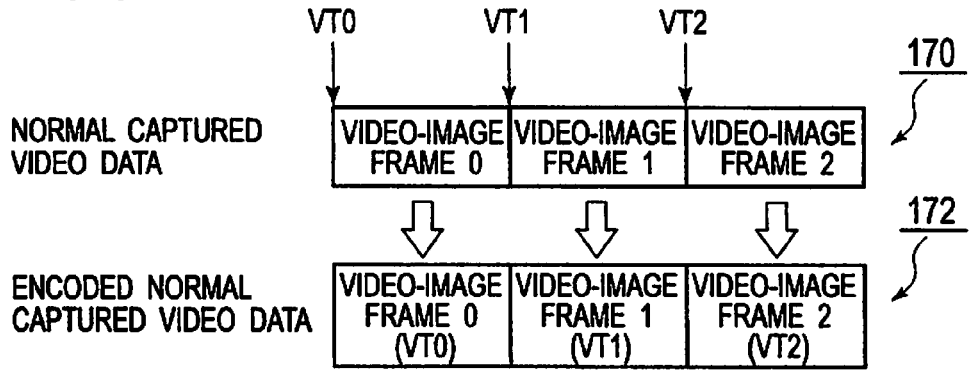
FIG. 5 is a conceptual diagram for explaining specific processes in a data encoder and a multiplexer in a normal video-image capture mode.
Figure 5B:
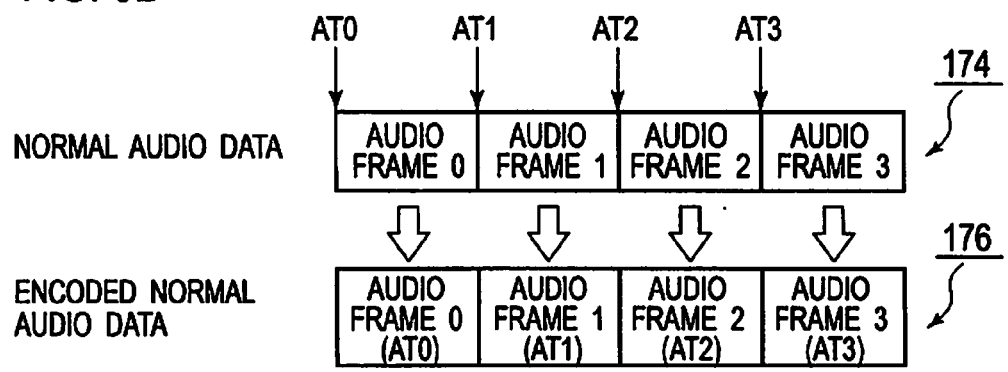

FIG. 5 is a conceptual diagram for explaining specific processes in data encoder 116 and multiplexer 120 in the normal video capture mode. As shown in FIG. 5A, in the case of the normal video capture mode, data encoder 116 encodes normal captured video data 170 that are divided into units of frames. Thus data encoder 116 creates encoded normal captured video data 172, and assigns time stamps to encoded normal captured video data 172 (the time stamps are denoted by VT0 to VT2 in FIG. 5). In addition, as shown in FIG. 5B, data encoder 116 encodes audio data 174 that are divided into units of frames. Thus data encoder 116 creates encoded normal audio data 176, and assigns time stamps to encoded normal audio data 176 (the time stamps are denoted by AT0 to AT3 in FIG. 5).

Figure 5C:
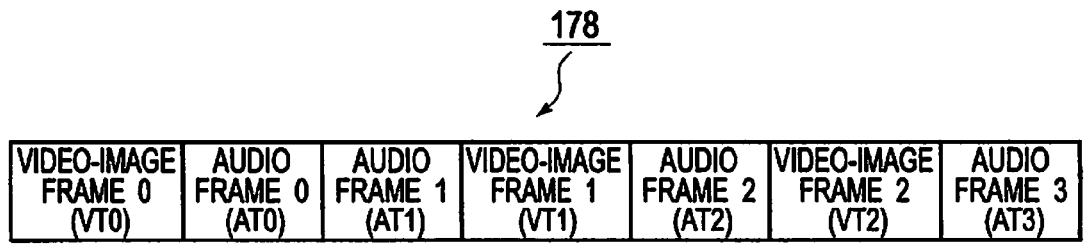

Then, as shown in FIG. 5C, multiplexer 120 multiplexes the encoded normal captured video data and the encoded normal audio data, and thereby creates encoded normal captured video/audio data 178.

In the normal video capture mode, video images of the exemplary performance, i.e., the form of the dancing or the exercise performed by the coach, the teacher, the instructor or the like, are captured, and the stream of the exemplary performance can be created, for example. The encoded normal captured video/audio data thus created can be referred to in the practice video capture mode.

Practice Video Capture Mode

As shown in FIG. 3, if the user selects a record position of encoded normal captured video/audio data through an operation input to operation unit 102 while the practice video capture mode is being selected (YES at S220), stream acquisition unit 104 acquires the encoded normal captured video/audio data from the selected record position (S222). Then, extraction unit 106 extracts encoded normal audio data and encoded normal captured video data from the encoded normal captured video/audio data acquired at stream acquisition step S222 (S224). Subsequently, data decoder 108 decodes the encoded normal audio data, thereby creating normal audio data, and decodes the encoded normal captured video data, thereby creating normal captured video data (S226).

Then, if the user gives an instruction to start capturing video images through an operation input to operation unit 102 (YES at S228), audio controller 132 causes audio output unit 110 to sequentially output the normal audio data decoded at decoding step S226 (S230). Subsequently, display controller 136 causes display unit 140 to sequentially display the video images that are being captured. In addition, video-image capture unit 112 captures video images of the object in synchronization with the output of the normal audio data to audio output unit 110, and thereby creates practice captured video data (S232).

To be more specific, video-image capture unit 112 starts capturing video images of the object on the condition that extraction unit 106 has started extracting encoded normal audio data (S224), that data decoder 108 has created normal audio data (S226), and that the normal audio data thus created has been held in an audio buffer (not illustrated) to a certain extent.

Then the practice captured video data created by video-image capture unit 112 at video image capturing step S232 are inputted, on a frame-by-frame basis, into a video-image buffer (not illustrated). Subsequently, data encoder 116 encodes the practice captured video data that are divided into units of frames. Thus, data encoder 116 creates encoded practice captured video data, and assigns thereto time stamps generated by time-stamp generator 114 (S234).

To be more specific, audio controller 132 considers a time point at which the practice captured video data are encoded as the time point corresponding to the encoded normal captured video/audio data. Audio controller 132 causes audio output unit 110 to output the normal audio data in synchronization with the time point indicated by the time stamp assigned at the time of decoding practice captured video data. In other words, in the practice video capture mode, time stamps are assigned to the video data in accordance with reference time points, but the time stamps for the audio data are assigned in advance. The audio data are outputted by audio output unit 110 so that the time points indicated by the time stamps can coincide with the reference time points.

Since display controller 136 is configured to cause display unit 140 or the like to display video images that are being captured, the user not only can listen to the sounds based on the normal audio data but also can visually recognize the video image that is being captured (e.g., the video image of a practice scene of the user him/herself) through display unit 140 or video-image display apparatus 160 at output step S230.

In addition, at output step S230, display controller 136 can cause display unit 140 or the like to display the normal captured video data decoded by data decoder 108. Hence, the user not only can listen to the sounds based on the normal audio data but also can visually recognize the video image of the exemplary performance based on the normal captured video data, through display unit 140 or video-image display apparatus 160, while the user is performing actions such as a dance or an exercise.

Recording controller 134 causes encoder memory 118 to hold the encoded practice captured video data encoded at encoding step S234 (S236). Then, multiplexer 120 multiplexes the encoded normal audio data and the encoded practice captured video data extracted by extraction unit 106 (S238).

Until the output (reproduction) of the normal audio data by audio output unit 110 has been finished, or until the user inputs an instruction to stop the practice video capture mode to the input to operation unit 102 (NO at S240), the processes at output step S230 onwards are performed.

If the output (reproduction) of the normal audio data by audio output unit 110 has already been finished, or the user inputs an instruction to stop the practice video capture mode to the input to operation unit 102 (YES at S240), multiplexer 120 creates a stream (encoded practice captured video/audio data) by multiplexing the encoded normal audio data and the encoded practice captured video data (S242). Then, recording controller 134 causes device memory 122 to record the encoded practice captured video/audio data created at stream creation step S242 (S244). In this respect, central controller 124 creates management information to associate encoded practice captured video/audio data with the encoded normal captured video/audio data serving as a basis of the encoded normal audio data. Central controller causes device memory 122 to hold the management information thus created.

FIG. 6 is a conceptual diagram for explaining specific processes in multiplexer 120 in the practice video capture mode. As shown in FIG. 6A, stream acquisition unit 104 acquires encoded normal captured video/audio data 180. As shown in FIG. 6B, extraction unit 106 extracts encoded normal audio data 182 from encoded normal captured video/audio data 180.

As shown in FIG. 6C, when video-image capture unit 112 starts capturing video images of an object, audio controller 132 causes audio output unit 110 to output normal audio data 186. Here, audio controller 132 considers the time points indicated by the time stamps assigned at the time of encoding practice captured video data 184 (the time stamps are denoted VT0 to VT2 in FIG. 6) as the time points corresponding to the encoded normal captured video/audio data, and the output of the normal audio data 186 is synchronized with the points time indicated by the time stamps assigned at the time of encoding practice captured video data 184. Then, as shown in FIG. 6D, multiplexer 120 multiplexes newly-created encoded practice captured video data and existing encoded normal audio data 182, thereby creating encoded practice captured video/audio data 188. In this respect, central controller 124 creates management information to associate encoded practice captured video/audio data with the encoded normal captured video/audio data serving as a basis of the encoded normal audio data. Subsequently, central controller 124 causes device memory 122 to hold the management information thus created.

As described thus far, in the practice video capture mode, while listening to the sounds based on the normal audio data, the user performs some actions, such as dancing a dance that the user is learning. In this respect, video-image capture unit 112 captures video images of the user's actions in synchronization with the normal audio data, and thereby creates the practice captured video data. Thus, the actions of the object in the practice captured video data are in synchronization with the normal audio data.

In addition, multiplexer 120 creates encoded practice captured video/audio data by multiplexing the encoded normal audio data and the practice captured video data which are in synchronization with the normal audio data, and which are created by capturing video images of the object performing actions with reference to the normal audio data. Thus, multiplexer 120 is capable of creating encoded practice captured video/audio data in synchronization with encoded normal captured video/audio data through the normal audio data. In addition, management information associates the encoded normal captured video/audio data created in the normal video capture mode with the encoded practice captured video/audio data created by referring to the encoded normal captured video/audio data in the practice video capture mode. Hence the user can compare the encoded practice captured video/audio data created in the practice video capture mode with the exemplary encoded normal captured video/audio data in the parallel reproduction mode.

Reproduction Mode

As shown in FIG. 4, video-audio processing apparatus 100 determines whether or not an operation input to operation unit 102 made by the user is an input to select the parallel reproduction mode (S250). If the input is not an input to select the parallel reproduction mode (if the input is merely an input to select the reproduction mode) (No at S250), a stream record position is selected in response to an operation input to operation unit 102 made by the user. Then, stream acquisition unit 104 sequentially acquires, from the selected record position, the encoded normal captured video/audio data and the encoded practice captured video/audio data as the stream, for example (S252). Next, extraction unit 106 sequentially extracts, from the stream acquired at stream acquisition step S252, the encoded video data and the encoded audio data (S254). Subsequently, data decoder 108 decodes the encoded video data thereby creating video data, and also decodes the encoded audio data thereby creating audio data (S256). Thereafter, display controller 136 causes display unit 140 to sequentially display the video data decoded at decoding step S256, while audio controller 132 causes audio output unit 110 to sequentially output the audio data (S258).

On the other hand, when the parallel reproduction mode is selected (YES at S250), a stream record position is selected in response to an operation input to operation unit 102 made by the user. Then, stream acquisition unit 104 sequentially acquires, from the selected record position, the encoded practice captured video/audio data. Next, stream acquisition unit 104 refers to the management information held in device memory 122, and further sequentially acquires the encoded normal captured video/audio data that are associated with the encoded practice captured video/audio data thus acquired (S260). Subsequently, extraction unit 106 sequentially extracts, from the acquired encoded normal captured video/audio data at stream acquisition step S252, the encoded normal captured video data and the encoded normal audio data, and also sequentially extracts the encoded practice captured video data from the encoded practice captured video/audio data (S262). Thereafter, data decoder 108 decodes the encoded normal captured video data thereby creating the normal captured video data, decodes the encoded practice captured video data thereby creating the practice captured video data, and decodes the encoded normal audio data thereby creating normal audio data (S264). After that, display controller 136 causes display unit 140 to sequentially display, in a parallel manner, the normal captured video data and the practice captured video data obtained by decoding at step S264. Audio controller 132 causes audio output unit 110 to sequentially output the normal audio data (S266).

Figure 7A:
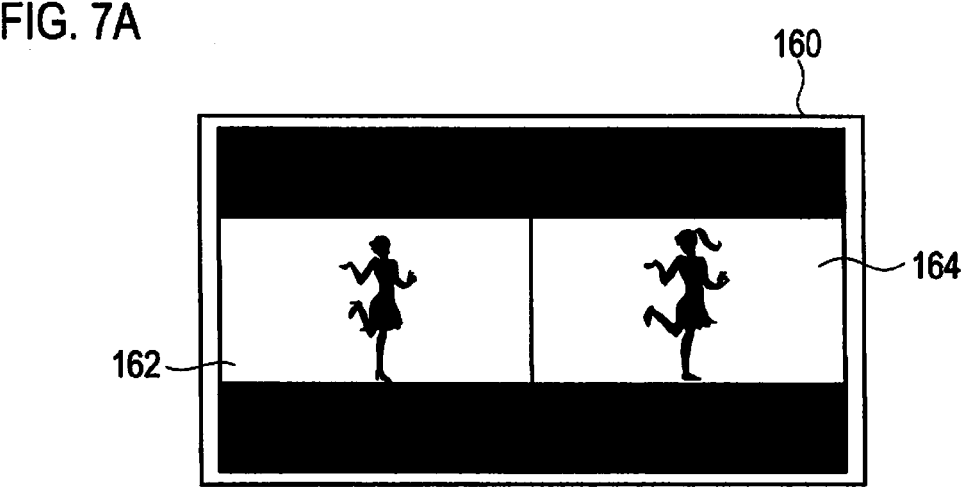
FIG. 7 is an explanation diagram for explaining an example in which a display controller causes a video-image display apparatus to display normal captured video data and practice captured video data in a parallel manner.

FIG. 7 is an explanation diagram for explaining an example in which display controller 136 causes video-image display apparatus 160 to display normal captured video data and practice captured video data in a parallel manner. As shown in FIG. 7A, display controller 136 divides the screen of video-image display apparatus 160 into two, for example. Then video image 162, based on the normal captured video data, is displayed on one of the two screen segments while video image 164 based on the practice captured video data is displayed on the other screen segment. Note that the encoded normal captured video/audio data are synchronized with the encoded practice captured video/audio data by using the normal audio data. Hence, by simply reproducing both the normal captured video data and the practice captured video data from their respective beginnings, it is possible to synchronize the normal captured video data with the practice captured video data.

Figure 7B:
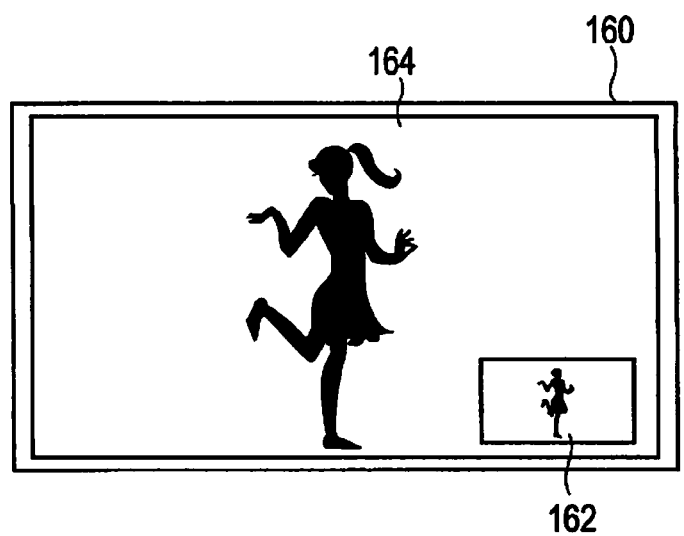

In addition, as shown in FIG. 7B, display controller 136 may display video image 164 based on the practice captured video data in the background portion within the screen of video-image display apparatus 160, and display video image 162 based on the normal captured video data by the PinP (picture in picture) method.

Accordingly, video-image display apparatus 160 displays, simultaneously and synchronously, the normal captured video data created by capturing a video image of the exemplary performance performed by the coach, the teacher, the instructor or the like and the practice captured video data created by capturing a video image of a practice scene of a user. Consequently, the user can visually recognize the displayed (reproduced) video images and thereby easily check the difference between the form of the user him/herself and the form of the exemplary performance.

The description is given by referring back to FIG. 4. It is determined that: whether or not display unit 140 has finished the display (reproduction) of the normal captured video data or the practice captured video data; whether or not audio output unit 110 has finished the output (reproduction) of the normal audio data; and whether or not the user inputs an instruction to stop the reproduction mode to operation unit 102 (S270). Then, it is determined that whether or not the current mode is the parallel reproduction mode (S272), in the case where the display unit 140 has not yet finished the display (reproduction) of the normal captured video data or the practice captured video data, or the audio output unit 110 has not yet finished the output (reproduction) of the normal audio data, or the user inputs an instruction to stop the reproduction mode to operation unit 102 (NO at S270). Subsequently, if the current mode is not the parallel reproduction mode (No at S272), the processes at stream acquisition step S252 onwards are performed. If the current mode is the parallel reproduction mode (YES at S272), the processes at stream acquisition step S260 onwards are performed.

As described thus far, the video-audio processing method of this embodiment allows the user to easily synchronize plural video images without taking any trouble to adjust the timings. In addition, the user can reliably synchronize plural video images with each other even under a video-image capture environment in which a noise, such as a surrounding noise, is generated.

Second Embodiment

Video-Audio Processing Apparatus 300

In the above-described first embodiment, video-audio processing apparatus 100 acquires a stream formed by multiplexing the audio data and the video data, and then extracts audio data from the acquired stream. It is, however, allowable that only the audio data are acquired and then the video data are created in synchronization with the output of the audio data. A second embodiment describes video-audio processing apparatus 300 capable of synchronizing plural video data with each other only on the basis of the audio data.

FIG. 8 is a functional block diagram illustrating a general configuration of video-audio processing apparatus 300 according to the second embodiment. As shown in FIG. 8, video-audio processing apparatus 300 includes operation unit 102, stream acquisition unit 304, data decoder 108, audio output unit 110, video-image capture unit 112, time-stamp generator 114, data encoder 116, encoder memory 118, multiplexer 120, device memory 122, central controller 124, display unit 140, and audio input unit 142. Central controller 124 also functions as video-image capture controller 130, audio controller 132, recording controller 134, and display controller 136. Those constituent elements that have been described earlier in the first embodiment, i.e. operation unit 102, data decoder 108, audio output unit 110, video-image capture unit 112, time-stamp generator 114, data encoder 116, encoder memory 118, multiplexer 120, device memory 122, central controller 124, display unit 140, audio input unit 142, video-image capture controller 130, audio controller 132, recording controller 134, and display controller 136, are not repeatedly described because these elements have the same functions as in the first embodiment. Here, the description is mainly given of audio-data acquiring unit 304, which has a different configuration.

Stream acquisition unit 304 acquires encoded audio data recorded in external recording medium 350, such as a DVD, a BD, or a flash memory. If video-audio processing apparatus 300 has a function of creating only the encoded audio data on the basis of the sounds collected by the audio input unit 142, stream acquisition unit 304 may acquire, from device memory 122, the encoded audio data created by video-audio processing apparatus 300.

In this embodiment, if video data are created plural or multiple times in the practice video capture mode, it is possible to create plural pieces of video data synchronized with a single piece of audio data acquired by stream acquisition unit 304. Thus, for example, even in the case where there is no video data of the exemplary performance but audio data to be referred to is determined, plural pieces of video data can be created in synchronization with each other on the basis of the audio data. In addition, for example, if plural pieces of video data are created by using video-audio processing apparatus 300 to record, or capture, video images of a single user playing a single music with different musical instruments, all of the plural pieces of video data can be synchronized with the audio data of the single music. Accordingly, it is possible to produce a promotion video or the like in which a single player plays as if playing plural different music instruments simultaneously.

Video-Audio Processing Method

Figure 9:
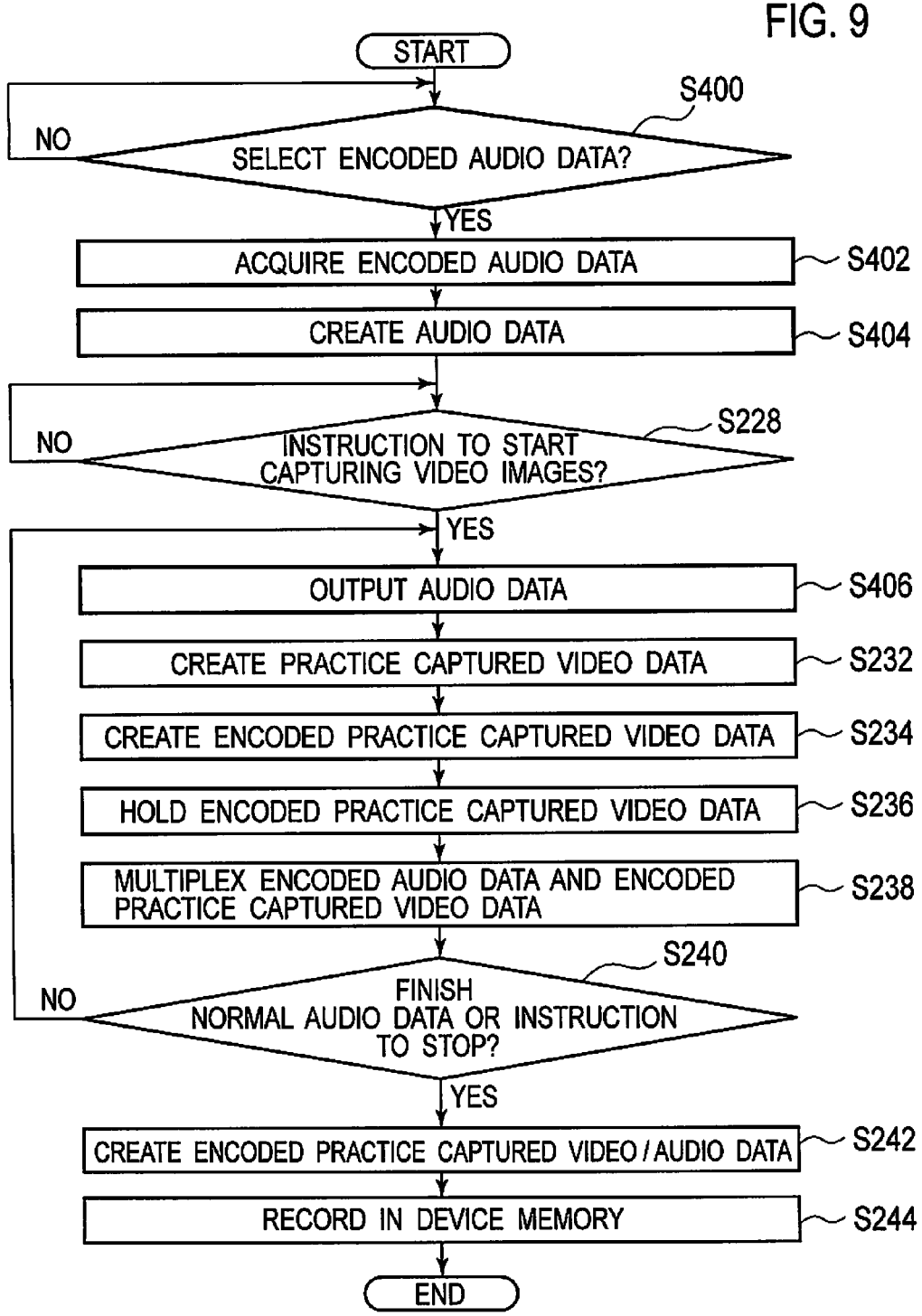
FIG. 9 is a flowchart explaining a flow of processes in a video-audio processing method using the video-audio processing apparatus according to the second embodiment.

FIG. 9 is a flowchart explaining a flow of processes in the video-audio processing method, particularly a flow of processes in the practice video capture mode, using video-audio processing apparatus 300 of the second embodiment. Note that FIG. 9 corresponds to the practice video capture mode as shown in FIG. 3 in the first embodiment. Processes performed at S228, and S232 to S244 in FIG. 9 are substantially the same as those in the video-audio processing method of the first embodiment. Hence, these processes are denoted by the same reference numerals, and no repetitive description is given below.

As shown in FIG. 9, when the practice video capture mode is selected and a record position of encoded audio data is selected in response to an operation input to operation unit 102 made by a user (YES at S400), stream acquisition unit 304 acquires the encoded audio data from the selected record position (S402). Then, data decoder 108 decodes the acquired encoded audio data, and thereby creates audio data (S404). Thereafter, if the user gives an instruction to start capturing video images through an operation input to operation unit 102 (YES at S228), audio controller 132 causes audio output unit 110 to sequentially output the audio data decoded at decoding step S404 (S406).

As described thus far, the video-audio processing method of this embodiment also allows the user to easily synchronize plural video images without taking any trouble to adjust the timings. In addition, the user can reliably synchronize plural video images with each other even under a video-image capture environment in which a noise, such as a surrounding noise, is generated.

The preferred embodiments of the invention have been described thus far by referring to the drawings, but it is a matter of course that the invention is not limited to the above-described embodiments. It is clear that those skilled in the art can conceive of various modifications and amendments within the scope of the claims. It should be understood that such modifications and amendments are included in the technical scope of the invention.

Note that the processes included in the video-audio processing method described in the present specification do not have to be performed chronologically in the order described in the flowcharts. Some of the processes may be performed in a parallel manner, or may be performed as a sub-routine.

The invention can be used in a video-audio processing apparatus and a video-audio processing method that synchronize video data with audio data.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A video-audio processing apparatus, comprising:
an audio output unit that outputs sound based on audio data that includes a time stamp;
an audio controller that controls the audio output unit;
a video-image capture unit that captures a video image of an object to create video data;
a data encoder that encodes the video data to create encoded video data;
a data decoder that decodes the encoded video data to create video data; and
a display controller that causes display of a video image based on the video data, wherein
the encoded video data includes a time stamp that is different from the time stamp of the audio data, wherein
the audio controller causes the audio output unit to output the sound when the video-image capture unit starts to capture a video image, wherein
when the display controller causes display of the video image decoded from the encoded video data, the audio controller causes the audio output unit to output the sound in synchronization of the time stamp of the audio data with the time stamp of the encoded video data.

2. The video-audio processing apparatus of claim 1, wherein
the video-audio processing apparatus processes first video-audio data and second video-audio data, wherein the first video-audio data includes first encoded video data and first encoded audio data that is data encoded from first audio data, and the second video-audio data includes second encoded video data and the first encoded audio data, wherein the first encoded video data is data encoded from first video data and the second encoded video data is data encoded from second video data,
the display controller causes synchronous display of a first video image based on the first video data and a second video image based on the second video data, the synchronous display being based on a first time stamp of the first encoded video data and a second time stamp of the second encoded video data,
the audio controller causes the audio output unit to output the sound in synchronization with the first and second time stamps, based on a third time stamp of the first encoded audio data.

3. The video-audio processing apparatus of claim 2, further comprising:

a central controller that creates first management information to associate the first video data with the first audio data, and second management information to associate the second video data with the first audio data.

4. A video-audio processing method, comprising:

outputting sound based on audio data with a time stamp, when a video-image capture unit starts to capture a video image to create video data;

encoding the video data to create encoded video data;

including a time stamp that is different from the time stamp of the audio data into the encoded video data; and outputting sound in synchronization of the time stamp of the audio data with the time stamp of the encoded video data, when a video image based on the video data decoded from the encoded video data is displayed.

5. The video-audio processing method of claim 4, further comprising:

processing first video-audio data and second video-audio data, wherein the first video-audio data includes first encoded video data and first encoded audio data that is data encoded from first audio data, and the second video-audio data includes second encoded video data and the first encoded audio data, wherein the first encoded video data is data encoded from first video data and the second encoded video data is data encoded from second video data, causing synchronous display of a first video image based on the first video data and a second video image based on the second video data, the synchronous display being based on a first time stamp of the first encoded video data and a second time stamp of the second encoded video data, causing the audio output unit to output the sound in synchronization with the first and second time stamps, based on a third time stamp of the first encoded audio data.

6. A non-transitory computer readable medium storing computer program code which, when executed by a computer, causes the computer to perform the functions of:

outputting sound based on audio data with a time stamp, when a video-image capture unit starts to capture a video image to create video data;

encoding the video data to create encoded video data;

including a time stamp that is different from the time stamp of the audio data into the encoded video data;

outputting sound in synchronization of the time stamp of the audio data with the time stamp of the encoded video data, when a video image based on the video data decoded from the encoded video data is displayed.

7. The non-transitory computer readable medium of claim 6, the computer program code, when executed by the computer, further causing the computer to perform the functions of:

inputting first video-audio data and second video-audio data, wherein the first video-audio data includes first encoded video data and first encoded audio data that is data encoded from first audio data, and the second video-audio data includes second encoded video data and the first encoded audio data, wherein the first encoded video data is data encoded from first video data and the second encoded video data is data encoded from second video data, causing synchronous display of a first video image based on the first video data and a second video image based on the second video data, the synchronous display being based on a first time stamp of the first encoded video data and a second time stamp of the second encoded video data, causing the audio output unit to output the sound in synchronization with the first and second time stamps, based on a third time stamp of the first encoded audio data.

* * * * *